7951X
I. White,
Bench Plane.
Patented Jan. 9, 1834.
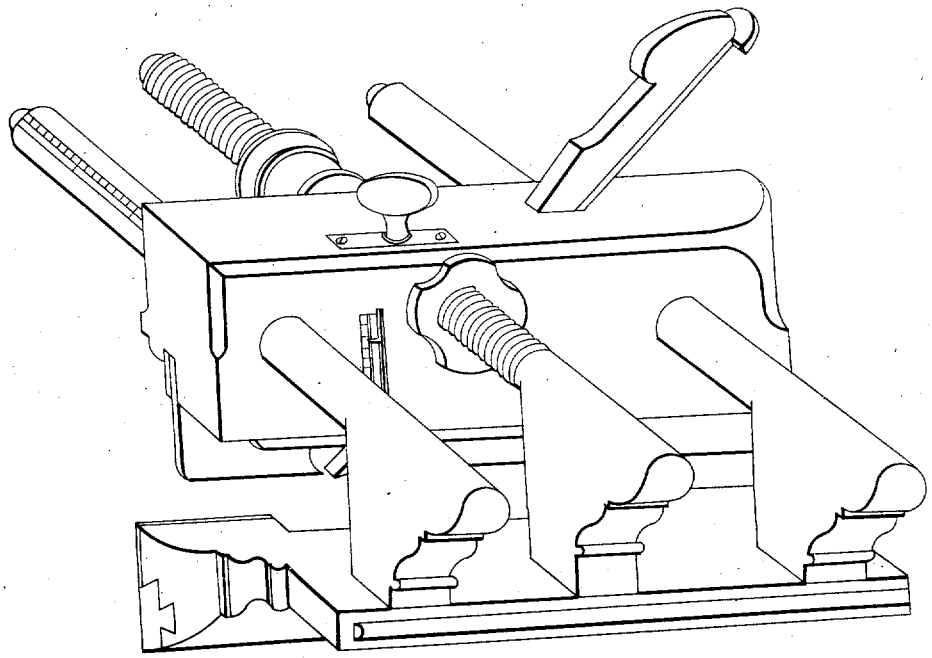
N. PETERS, PHOTO-LITHOGRAPHER, WASHINGTON, D. C.

Jan 9. 1834

Israel. White

Letters Patent

The schedule referred to in these Letters Patent and making part of the same containing a description in the words of the said Israel White himself of his improvement in the instrument or tool called a Plough used by carpenters & other artificers The old or common Plough plane familiar in common use, consist of two irregular square shaped oblong blocks; one called the plough. having a narrow oblique mortice cut through it to admit the plane iron which performs the office of ploughing the furrows or grooves —

The other block is called the fence running parallel with the first and so connected by two wooden screws denominated arms about one inch distant from the end of each block. that the upper surface of the fence when brought near the plough by means of screwing the arms, may pass under and in close contact with its lower surface. By a contrary movement they can be extended further apart & the adjustment depends upon a female screw working on one end of the arm upon the side of the plough together with a small screw nut upon the opposite side working also upon the arm, to be tightened or slackened at pleasure, which regulation determines whatever distance the groove shall be cut. This is nevertheless difficult in the performance because an inconvenience presents itself whenever both arms are to be moved in such a manner that the position of the fence shall be brought parallel to the grooving plate and unless it is effected by measuring the distance with a rule at each end of the fence & tightening the screw nut upon the arm a great deal of tedious delay is usually experienced by the mechanic Upon the under side of the plough is firmly attached an iron plate divided into two parts between which & thro' the narrow oblique mortice already described, passes the plane iron secured by a wedge proporfor such a purpose — The iron plate and the plane iron being considerably lower than the plough block, the furrow or groove is sunk into boards with much ease & rapidity & its depth regulated by the following contrivance. — Upon the top of the plough block, a small brass plate is sunk immediately over a square mortice passing thro the plough to admit a square block of brass called a barrel to be moved up and down by means of a screw secured by a collar underneath the brass plate the lower end of the screw entering & is made fast to the upper part of the barrel — The bottom of the barrel is firmly attached to a stout piece of plate iron of about 3 or 4 inches long, having an extensive notch cut out of the side next to the grooving plate, extending over the divided part of that plate where the plane iron passes & ascends or descends with the movements of the barrel This notched piece of iron is denominated a shoe & when worked by the screw and barrel the whole is altogether known by the appellation of the stop, — The above is the old fashioned construction of a common plough plane whose arms when moved to measure any required distance from the fence, could never affect its parallel with the grooving plate without recourse to the rule for adjustment the process was always found tedious and troublesome & causing much delay. To obviate so manifest an imperfection and to keep the fence steadily in its required position when the proper distance of the groove is to be determined is the object of my improved invention upon the plough for which I claim the right to a patent it being wholly new & distinguished from any other invention heretofore known or discovered. It consists of three arms passing thro' the block nearly in a line with each other, the two outer ones being plain sliding cylinders & the middle one a screw & nuts with female screws much upon the same construction and size as the old plough arms — By adjusting this screw arm with the nuts attached to it the distance where the groove should be cut can be ascertained with great facility & precision, & the fence being kept steadily in its place is always parallel to the plate without 7951X 53 the danger of varying in the least degree from its position.

To regulate the stop which determines the depth that grooves are to be cut a small scale graduated to an inch more or less is inserted, transversely on the side of the plough block next to the fence A small fissure is cut by the side of it thro which an index is attached to the barrel and is moved up or down with it so that the stop can regulate the depth of the groove to any required dimension by adjusting the index when passing the graduations upon the scale.

This simple contrivance renders the plough of infinitely more value in its use to various artificers who depend upon its expeditious operations by saving much time otherwise lost in the adjustment to ascertain the distance & depths for grooving.

Witnesses
James Aiken
Chl Bard Rees

Israel White

Ex'd.
Chf W.

876 20s

Drawing